(12) United States Patent
Isami et al.

(10) Patent No.: US 11,491,990 B2
(45) Date of Patent: Nov. 8, 2022

(54) CONTROL SYSTEM FOR HYBRID VEHICLE

(71) Applicant: TOYOTA JIDOSHA KABUSHIKI KAISHA, Toyota (JP)

(72) Inventors: Yoichiro Isami, Mishima (JP); Tatsuya Imamura, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 121 days.

(21) Appl. No.: 17/189,701

(22) Filed: Mar. 2, 2021

(65) Prior Publication Data
US 2021/0309204 A1 Oct. 7, 2021

(30) Foreign Application Priority Data

Apr. 3, 2020 (JP) .............................. JP2020-067567

(51) Int. Cl.
| B60W 30/192 | (2012.01) |
| B60K 6/36 | (2007.10) |
| B60K 6/387 | (2007.10) |
| B60W 10/06 | (2006.01) |
| B60W 10/02 | (2006.01) |
| B60W 10/08 | (2006.01) |

(Continued)

(52) U.S. Cl.
CPC .............. B60W 30/192 (2013.01); B60K 6/26 (2013.01); B60K 6/36 (2013.01); B60K 6/387 (2013.01); B60W 10/02 (2013.01); B60W 10/06 (2013.01); B60W 10/08 (2013.01); B60W 20/15 (2016.01); F01N 3/10 (2013.01); F02D 41/024 (2013.01); F02P 5/1502 (2013.01); B60W 2540/10 (2013.01); B60W 2710/021 (2013.01); B60W 2710/0644 (2013.01); B60W 2710/0694 (2013.01); B60W 2710/081 (2013.01); B60W 2710/083 (2013.01)

(58) Field of Classification Search
CPC .... B60W 30/192; B60W 10/02; B60W 10/06; B60W 10/08; B60W 20/15; B60W 2540/10; B60W 2710/021; B60W 2710/0644; B60W 2710/0694; B60W 2710/081; B60W 2710/083; F01N 3/10; F02D 41/024; F02P 5/1502; B60Y 2300/474; B60K 6/445; B60K 6/26; B60K 6/30; B60K 6/387
See application file for complete search history.

(56) References Cited

U.S. PATENT DOCUMENTS

2016/0368361 A1 12/2016 Endo et al.
2017/0305411 A1* 10/2017 Leone .................... F02D 21/08

FOREIGN PATENT DOCUMENTS

CN 101678827 A * 3/2010 ............ B60K 6/365
JP 2009-274628 A 11/2009

(Continued)

Primary Examiner — George C Jin
(74) Attorney, Agent, or Firm — Oliff PLC

(57) ABSTRACT

A control system for a hybrid vehicle that reduces a change in an engine torque when warming a catalyst. The hybrid vehicle comprises a catalyst that purifies exhaust gas, a first motor, a differential mechanism having a plurality of rotary elements, and an engagement device that selectively connects the first motor to an engine. A controller is configured to determine whether it is necessary to warm the catalyst, and disengage the engagement device while retarding an ignition timing of the engine when it is necessary to warm the purifying device.

11 Claims, 14 Drawing Sheets

(51) Int. Cl.
*F01N 3/10* (2006.01)
*F02P 5/15* (2006.01)
*F02D 41/02* (2006.01)
*B60K 6/26* (2007.10)
*B60W 20/15* (2016.01)

(56) References Cited

FOREIGN PATENT DOCUMENTS

| JP | 2013-067297 A | | 4/2013 | |
|----|---------------|---|--------|---|
| JP | 2015-051734 A | | 3/2015 | |
| JP | 2017-007437 A | | 1/2017 | |
| JP | 2018134929 A | * | 8/2018 | ............. B60K 6/445 |

* cited by examiner

FIG. 3

| OPERATING MODE | | CL1 | CL2 | B1 | MG1 | MG2 | ENG |
|---|---|---|---|---|---|---|---|
| HV MODE | HV-LOW MODE | ● | – | – | G | M | ON |
| | HV-HIGH MODE | – | ● | – | G | M | ON |
| | FIXED MODE | ● | ● | – | | | ON |
| EV MODE | DUAL-MOTOR MODE EV-LOW MODE | – | – | ● | M | M | OFF |
| | DUAL-MOTOR MODE EV-HIGH MODE | – | ● | ● | M | M | OFF |
| | SINGLE-MOTOR MODE | – | – | – | | M | OFF |

CONTROL SYSTEM FOR HYBRID VEHICLE

CROSS-REFERENCE TO RELATED APPLICATIONS

The present disclosure claims the benefit of Japanese Patent Application No. 2020-067567 filed on Apr. 3, 2020 with the Japanese Patent Office, the disclosures of which are incorporated herein by reference in its entirety.

BACKGROUND

Field of the Disclosure

Embodiments of the present disclosure relate to the art of a control system for a hybrid vehicle in which a prime mover includes an engine and a motor, and more especially, to a control system for warming up an exhaust gas purification catalyst.

Discussion of the Related Art

JP-A-2013-067297 describes a control system for a hybrid vehicle configured to warm up a catalyst for purifying exhaust gas. According to the teachings of JP-A-2013-067297, when engine request power is greater than a prescribed power, a warm-up control of the purifying catalyst is executed while generating the request power. By contrast, when the requested power is less than the prescribed power, the warm-up control of the purifying catalyst is executed while operating the engine at an idling speed. In addition, in order to expedite the warm-up of the catalyst, an ignition timing of the engine is retarded.

JP-A-2009-274628 describes a control method of a hybrid vehicle. According to the teachings of JP-A-2009-274628, a temperature of a motor is measured when a warm-up of a catalyst is not required, and an output power of the motor is restricted with an increase in the temperature of the motor. By contrast, when a warm-up of the catalyst is required, the engine and the motor are operated to generate a required power without restricting the output power of the motor while warming the catalyst.

JP-A-2015-051734 describes a control device of hybrid vehicle. The control device taught by JP-A-2015-051734 is configured to maintain stability of vehicle behavior even if an engine torque is changed by a braking operation during warm-up of a catalyst. To this end, according to the teachings of JP-A-2015-051734, the warm-up of the catalyst is stopped when a braking operation is executed. Since the engine torque will not be changed significantly unless the brake is depressed, according to the teachings of JP-A-2015-051734, the warm-up of the catalyst is continued during normal propulsion.

JP-A-2017-007437 describes a drive unit for hybrid vehicle. According to the teachings of JP-A-2017-007437, an output torque of an engine is distributed to a first motor and an input member through a power distribution device. The torque delivered to the first motor is translated to an electric power and supplied to a second motor, and a torque generated by the second motor is synthesized with the torque delivered to the output member directly from the engine. An operating mode of the power distribution device is shifted between a high mode and a low mode by manipulating clutches, and a speed ratio between the engine and the output member is changed between the high mode and the low mode.

In vehicles, a three-way catalyst is arranged in an exhaust pipe of an engine to purify detrimental substance contained in an exhaust gas. In order to oxidize or reduce the detrimental substance, it is necessary to raise a temperature of catalyst to an activation temperature. To this end, a warm-up of the catalyst is executed in a case of starting the engine at a low temperature. For example, as described in JP-A-2013-067297 and JP-A-2009-274628, the temperature of the catalyst may be raised promptly by retarding an ignition timing of the engine. However, as described in JP-A-2015-051734, combustion in the engine may be destabilized to change the engine torque significantly as a result of retarding the ignition timing. On the other hand, in the vehicle taught by JP-A-2017-007437, the engine is connected to the first motor through the clutch. Therefore, if an ignition timing of the engine is retarded to warm up the catalyst in the vehicle taught by JP-A-2017-007437, the first motor will be rotated passively by a rotation of the engine. As a result, the torque of the engine may be changed significantly by an inertial load of the first motor, and hence a behavior of the vehicle may become unstable.

SUMMARY

Aspects of embodiments of the present disclosure have been conceived noting the foregoing technical problems, and it is therefore an object of the present disclosure to provide a control system for a hybrid vehicle configured to reduce a change in an engine torque when warming a catalyst.

The control system according to the exemplary embodiment of the present disclosure is applied to a hybrid vehicle comprising: an engine serving as a prime mover; a purifying device that purifies an exhaust gas emitted from the engine; a first motor having a generating function; a differential mechanism having at least three rotary elements; and an engagement device that selectively connects the first motor to the engine. In the hybrid vehicle, the engine is connected to one of the rotary elements, the first motor is connected to another one of the rotary elements, the first motor is rotated passively by a rotation of the engine when the engagement device is in engagement. In order to achieve the above-explained objective, according to the exemplary embodiment of the present disclosure, the control system is provided with a controller that controls the hybrid vehicle. Specifically, the controller is configured to: determine whether it is necessary to warm the purifying device; and disengage the engagement device and retard an ignition timing of the engine when it is necessary to warm the purifying device.

In a non-limiting embodiment, the control system may further comprise: a temperature sensor that detects a temperature of the purifying device; a temperature comparator that compares the temperature of the purifying device detected by the temperature sensor with an activation temperature of the purifying device; and an ignition command transmitter that controls an ignition timing of the engine. The controller may be further configured to determine that it is necessary to warm the purifying device, when the temperature comparator determines that the temperature of the purifying device detected by the temperature sensor is lower than the activation temperature.

In a non-limiting embodiment, the controller may be further configured to: determine whether the engine is in a self-sustaining condition when it is necessary to warm the purifying device; raise a speed of the engine to a self-sustaining speed by the first motor when the engine is not in the self-sustaining condition; and disengage the engagement device after raising the speed of the engine to the self-sustaining speed.

In a non-limiting embodiment, the prime mover may include a second motor connected to an output member, and the controller may be further configured to generate a drive force by the second motor when an accelerator pedal is depressed during warm-up of the purifying device.

In a non-limiting embodiment, the controller may be further configured to engage the engagement device and retard the ignition timing of the engine, when the drive force possible to be generated by the second motor is equal to or less than a predetermined value.

In a non-limiting embodiment, the controller may be further configured to increase a retarding amount of the ignition timing when the engagement device is disengaged, compared to that of a case in which the engagement device is engaged.

In a non-limiting embodiment, the controller may be further configured to rotate the first motor by the engine to generate electricity when warming the purifying device while engaging the engagement device.

In a non-limiting embodiment, the control system may further comprise an electric storage device that is electrically connected to the first motor and the second motor. The controller may be further configured to: determine that the drive force possible to be generated by the second motor is equal to or less than the predetermined value when a state of charge level of the electric storage device is equal to or lower than a predetermined level; engage the engagement device when the state of charge level of the electric storage device is equal to or lower than the predetermined level; and disengage the engagement device when the state of charge level of the electric storage device is higher than the predetermined level.

In a non-limiting embodiment, the control system may further comprise an electric storage device that is electrically connected to the first motor and the second motor. The controller may be further configured to: select a control mode of the electric storage device from a first mode in which a state of charge level of the electric storage device is maintained as far as possible, and a second mode in which the hybrid vehicle is propelled while consuming an electric power accumulated in the electric storage device; disengage the engagement device when the first mode is selected; and engage the engagement device when the second mode is selected.

In a non-limiting embodiment, the controller may be further configured to engage the engagement device when it is not necessary to warm the purifying device.

In a non-limiting embodiment, the differential mechanism may include: a first differential mechanism that performs a differential action among a first rotary element that is connected to the engine, a second rotary element that is connected to the first motor, and a third rotary element that transmits torque to a pair of drive wheels; and a second differential mechanism that performs a differential action among a fourth rotary element that is connected to the output member, a fifth rotary element that is connected to the third rotary element, and a sixth rotary element. The engagement device may include: a first engagement device that selectively connects the first rotary element to the sixth rotary element; and a second engagement device that selectively connects any two of the fourth rotary element, the fifth rotary element, and the sixth rotary element.

Thus, according to the exemplary embodiment of the present disclosure, the ignition timing of the engine is retarded when warming the purifying device so that high-temperature exhaust gas is delivered to the purifying device thereby raising the temperature of the purifying device rapidly to the activation temperature. In this situation, the first clutch is disengaged to disconnect the first motor from the engine when the rotational speed of the engine is raised to the self-sustaining speed. According to the exemplary embodiment of the present disclosure, therefore, the first motor will not be rotated passively by the rotation of the engine during the warm-up of the purifying device. In other words, the torque of the engine will not be changed significantly by the inertial load of the first motor during execution of the ignition retard. For this reason, the ignition timing may be retarded to such an extent that the purifying device is not thermally damaged so that the temperature of the purifying device can be raised promptly.

In addition, since the torque of the engine will not be changed significantly during the warm-up of the purifying device, misfire of the engine may be determined accurately based on a change in a rotation of the crankshaft.

Further, when the engagement device is disengaged, the vehicle may be propelled by a drive force generated by the second motor while warming the purifying device.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

FIG. 3 is a table showing engagement states of engagement devices and operating conditions of prime movers in each operating mode;

DETAILED DESCRIPTION OF THE PREFERRED EMBODIMENT(S)

Figure 1:
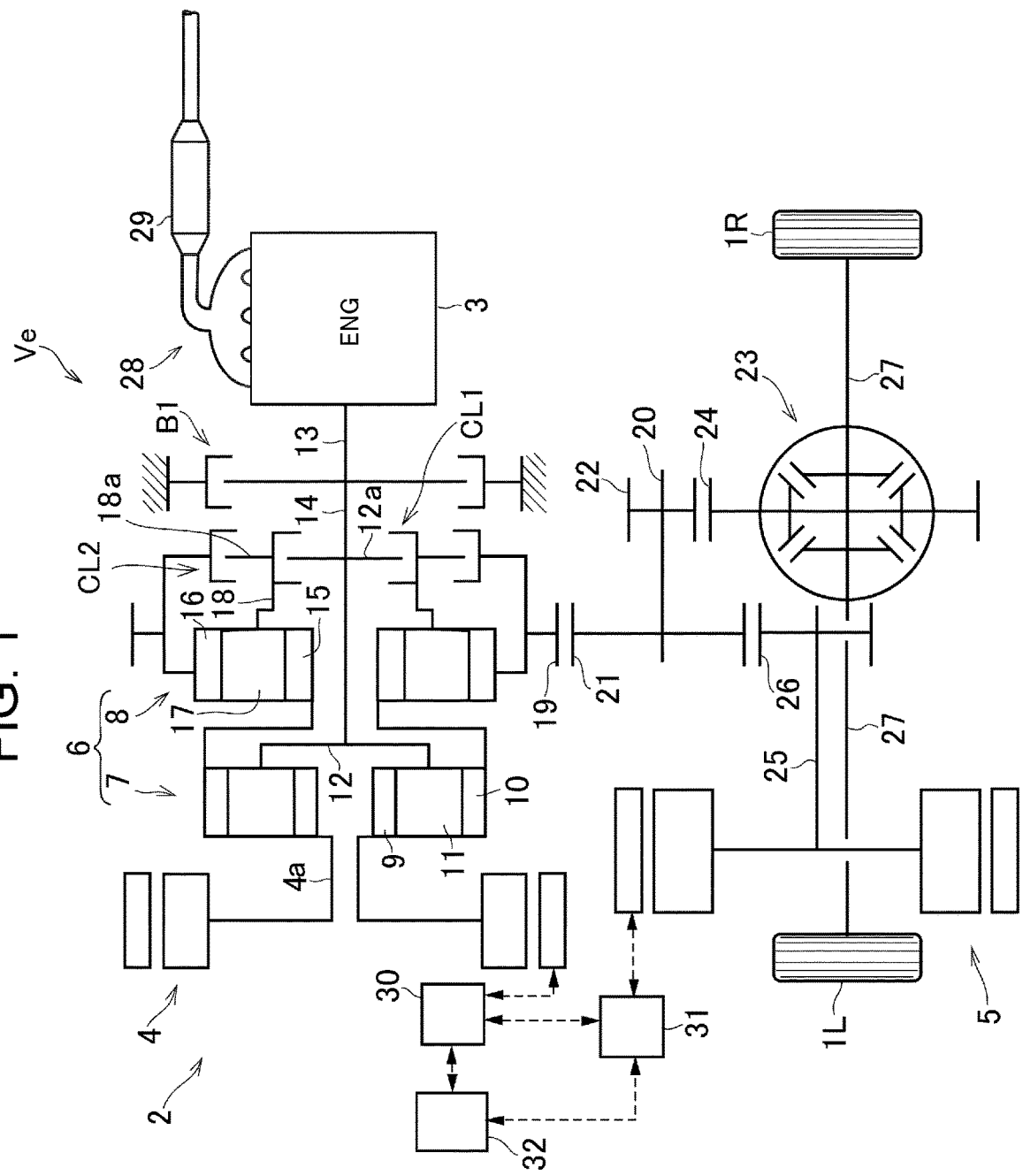
FIG. 1 is a skeleton diagram showing a drive unit of a hybrid vehicle to which the control system according to embodiment of the present disclosure is applied.

An exemplary embodiment of the present application will now be explained with reference to the accompanying drawings. Referring now to FIG. 1, there is shown one example of a structure of a hybrid vehicle (as will be simply called the "vehicle" hereinafter) Ve to which the control system according to the embodiment is applied. Specifically, FIG. 1 shows a drive unit 2 of the vehicle Ve that drives a pair of front wheels 1R and 1L, and the drive unit 2 comprises an engine (referred to as "ENG" in the drawings) 3, a first motor (referred to as "MG1" in the drawings) 4, and a second motor (referred to as "MG2" in the drawings) 5. According to the exemplary embodiment, a motor-generator having a generating function is adopted as the first motor 4. In the vehicle Ve, a speed of the engine 3 is controlled by the first motor 4, and the second motor 5 is driven by electric power generated by the first motor 4 to generate a drive force for propelling the vehicle Ve. Optionally, the motor-generator having a generating function may also be adopted as the second motor 5.

A power split mechanism 6 as a differential mechanism is connected to the engine 3. The power split mechanism 6 includes a power split section 7 that distributes an output torque of the engine 3 to the first motor 4 side and to an output side, and a transmission section 8 that alters a torque split ratio.

In the vehicle Ve shown in FIG. 1, a single-pinion planetary gear unit that performs differential action among three rotary elements is adopted as the power split section 7. Accordingly, the power split section 7 serves as a first differential mechanism of the embodiment. Specifically, the power split section 7 comprises: a sun gear 9; a ring gear 10 as an internal gear arranged concentrically around the sun gear 9; a plurality of pinion gears 11 interposed between the sun gear 9 and the ring gear 10 while being meshed with both gears 9 and 10; and a carrier 12 supporting the pinion gears 11 in a rotatable manner. In the drive unit 2, accordingly, the carrier 12 serves as a first rotary element, the sun gear 9 serves as a second rotary element, and the ring gear 10 serves as a third rotary element.

An output shaft 13 of the engine 3 is connected to an input shaft 14 of the power split mechanism 6 connected to the carrier 12 so that output power of the engine 3 is applied to the carrier 12. Optionally, an additional gear unit may be interposed between the input shaft 14 and the carrier 12, and a damper device and a torque converter may be interposed between the output shaft 13 and the input shaft 14.

The sun gear 9 is connected to the first motor 4. In the vehicle Ve shown in FIG. 1, the power split section 7 and the first motor 4 are arranged concentrically with a rotational center axis of the engine 3, and the first motor 4 is situated on an opposite side of the engine 3 across the power split section 7. The transmission section 8 is interposed coaxially between the power split section 7 and the engine 3.

The transmission section 8 is also a single-pinion planetary gear unit comprising: a sun gear 15; a ring gear 16 as an internal gear arranged concentrically around the sun gear 15; plurality of pinion gears 17 interposed between the sun gear 15 and the ring gear 16 while being meshed with both gears 15 and 16; and a carrier 18 supporting the pinion gears 17 in a rotatable manner. Thus, the transmission section 8 is also adapted to perform a differential action among the sun gear 15, the ring gear 16, and the carrier 18. Accordingly, the transmission section 8 serves as a second differential mechanism of the embodiment. In the transmission section 8, the sun gear 15 is connected to the ring gear 10 of the power split section 7, and the ring gear 16 is connected to an output gear 19. In the drive unit 2, accordingly, the ring gear 16 serves as a fourth rotary element, the sun gear 15 serves as a fifth rotary element, the carrier 18 serves as a sixth rotary element, and the output gear 19 serves as an output member.

In order to operate the power split section 7 and the transmission section 8 as a complex planetary gear unit, a first clutch CL1 as a first engagement device is disposed to selectively connect the carrier 18 of the transmission section 8 to the carrier 12 of the power split section 7 connected to the input shaft 14. The first clutch CL1 includes a pair of engagement elements 12a and 12b selectively engaged to each other to transmit the torque. Specifically, the input element 12a is fitted onto the input shaft 14, and the output element 12b is connected to the carrier 18 of the transmission section 8. For example, a wet-type multiple plate clutch or a dog clutch may be adopted as the first clutch CL1. Otherwise, a normally stay clutch may also be adopted as the first clutch CL1. An engagement state of the normally stay clutch is switched upon reception of the command signal, and the normally stay clutch stays in the current engagement state even if the signal transmission thereto is interrupted. Thus, in the drive unit 2 shown in FIG. 1, the power split section 7 is connected to the transmission section 8 to serve as a complex planetary gear unit by engaging the first clutch CL1. In the complex planetary gear unit thus formed, the carrier 12 of the power split section 7 is connected to the carrier 18 of the transmission section 8 to serve as an input element, the sun gear 9 of the power split section 7 serves as a reaction element, and the ring gear 16 of the transmission section 8 serves as an output element. That is, the complex planetary gear unit is configured such that the input shaft 14, the output shaft 4a of the first motor 4, and an after-mentioned driven gear 21 are allowed to rotate in a differential manner.

A second clutch CL2 as a second engagement device is disposed to rotate the rotary elements of the transmission section 8 integrally. For example, a friction clutch, a dog clutch and a normally stay clutch may also be adopted as the second clutch CL2 to selectively connect the carrier 18 to the ring gear 16 or the sun gear 15, or to connect the sun gear 15 to the ring gear 16. In the drive unit 2 shown in FIG. 1, specifically, the second clutch CL2 is engaged to connect the carrier 18 to the ring gear 16 to rotate the rotary elements of the transmission section 8 integrally. The second clutch CL2 includes a pair of engagement elements 18a and 18b selectively engaged to each other to transmit the torque. Specifically, the input element 18a is connected to the carrier 18 of the transmission section 8, and the output element 18b is connected to the ring gear 16 of the transmission section 8.

A counter shaft 20 extends parallel to a common rotational axis of the engine 3, the power split section 7, and the transmission section 8. A driven gear 21 is fitted onto one end of the counter shaft 20 to be meshed with the output gear 19, and a drive gear 22 is fitted onto the other end of the counter shaft 20 to be meshed with a ring gear 24 of a differential gear unit 23 as a final reduction unit. The driven gear 21 is also meshed with a drive gear 26 fitted onto a rotor shaft 25 of the second motor 5 so that power or torque of the second motor 5 is synthesized with power or torque of the output gear 19 at the driven gear 21 to be distributed from the differential gear unit 23 to the front wheels 1R and 1L via each driveshaft 27.

In order to selectively stop a rotation of the engine 3 when operating the first motor 4 to propel the vehicle Ve, a brake B1 as a third engagement device is arranged in the drive unit 2. For example, a frictional engagement device or a dog brake may be adopted as the brake B1, and the brake B1 is fixed to a predetermined stationary member in radially outer side of the output shaft 13 or the input shaft 14. The carrier 12 of the power split section 7 and the carrier 18 of the transmission section 8 are allowed to serve as reaction elements, and the sun gear 9 of the power split section 7 is allowed to serve as an input element by applying the brake B1 to halt the output shaft 13 or the input shaft 14. To this end, the brake B1 may be adapted to stop the rotation of the output shaft 13 or the input shaft 14 not only completely but also incompletely to apply a reaction torque to those shafts. Alternatively, a one-way clutch may be adopted instead of the brake B1 to restrict a reverse rotation of the output shaft 13 or the input shaft 14.

An exhaust gas purifying catalyst (as will be simply called the "catalyst" hereinafter) 29 as a purifying device is arranged in an exhaust system 28. The catalyst 29 is adapted to reduce concentration of the exhaust gas by oxidizing HC (i.e., hydrocarbons) and CO (i.e., carbon monoxide) and reducing nitrogen oxide. To this end, a temperature of the catalyst 29 has to be raised to an activation temperature, and an upper limit temperature is set to limit thermal damage on the catalyst 29.

A first power control system 30 is connected to the first motor 4, and a second power control system 31 is connected to the second motor. Each of the first power control system 30 and the second power control system 31 includes an inverter and a converter, respectively. The first power control system 30 and the second power control system 31 are connected to each other, and also connected individually to an electric storage device 32 including a lithium ion battery, a capacitor, and a solid-state battery. For example, when the first motor 4 is operated as a generator while establishing a reaction torque, an electric power generated by the first motor 4 may be supplied directly to the second motor 5 without passing through the electric storage device 32.

Characteristics of the lithium ion battery, the capacitor, and the solid-state battery adopted as the electric storage device 32 are different from one another. The electric storage device 32 may be formed by combining those storage devices arbitrarily according to need.

Figure 2:
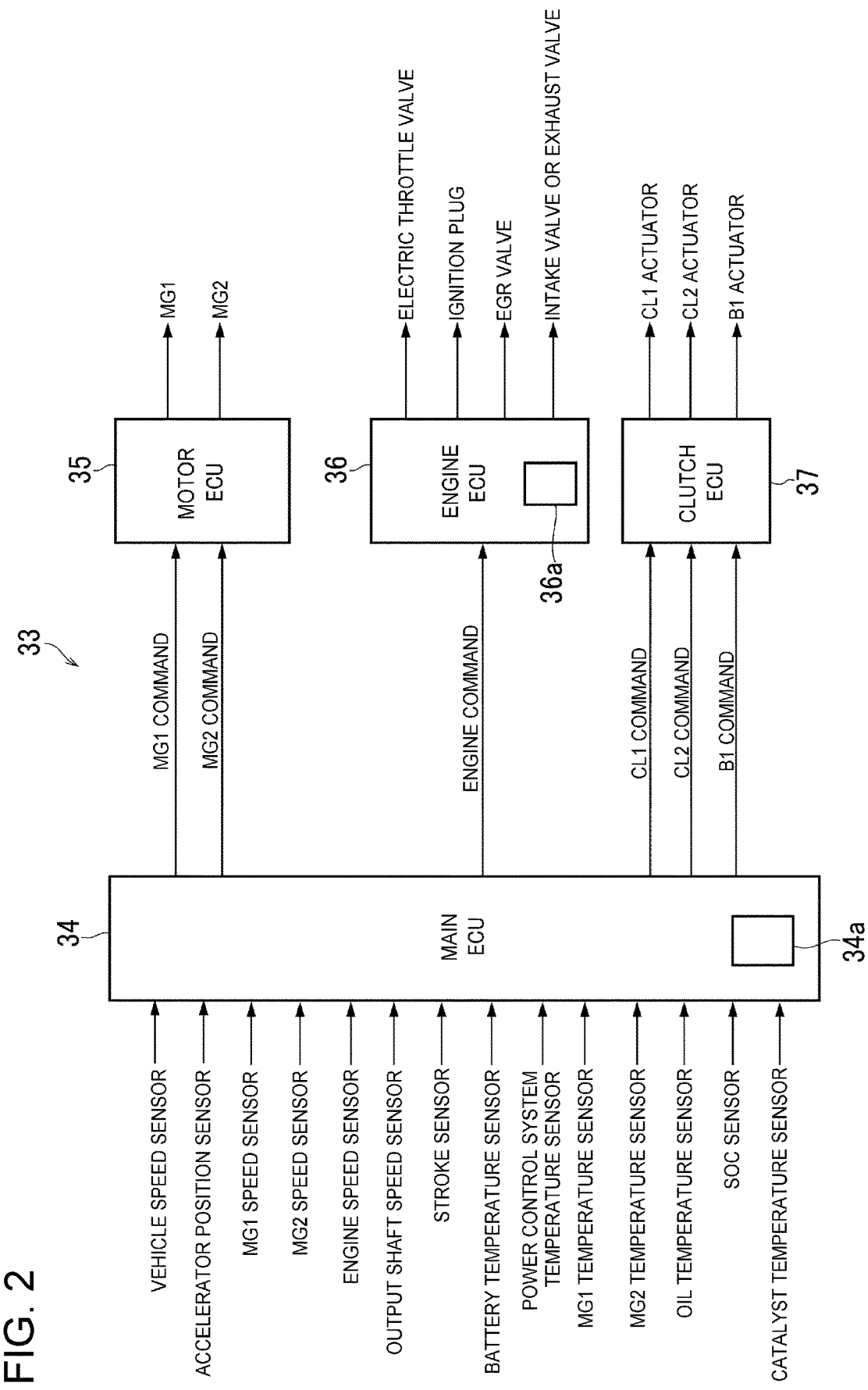
FIG. 2 is a block diagram showing a structure of an electronic control unit.

In order to control the first power control system 30, the second power control system 31, the first clutch CL1, the second clutch CL2, the brake B1 and so on, the vehicle Ve is provided with an electronic control unit (to be abbreviated as the "ECU" hereinafter) 33 as a controller. The ECU 33 has a microcomputer as its main constituent, and as shown in FIG. 2, the ECU 33 comprises a main ECU 34, a motor ECU 35, an engine ECU 36 and a clutch ECU 37.

The main ECU 34 is configured to execute a calculation based on incident data transmitted from sensors as well as maps and formulas installed in advance, and transmits a calculation result to the motor ECU 35, the engine ECU 36 and the clutch ECU 37 in the form of command signal. For example, the main ECU 34 receives data about; a vehicle speed; an accelerator position; a speed of the first motor 4; a speed of the second motor 5; a speed of the output shaft 13 of the engine 3; an output speed such as a rotational speed of the counter shaft 20 of the transmission section 8; strokes of pistons of the clutches CL1, CL2, and the brake B1; a temperature of the electric storage device 32; temperatures of the power control systems 30 and 31; a temperature of the first motor 4; a temperature of the second motor 5; a temperature of oil (i.e., ATF) lubricating the power split section 7 and the transmission section 8; a state of charge (to be abbreviated as the "SOC" hereinafter) level of the electric storage device 32; a temperature of the catalyst 29 and so on. As shown in FIG. 2, the main ECU 34 is provided with a temperature comparator 34a that is configured to compare an input temperature to the catalyst 29 with the activation temperature of the catalyst 29. For example, if a temperature of the catalyst 29 detected by a catalyst temperature sensor is lower than the activation temperature, the main ECU 34 determines that it is necessary to warm up the catalyst 29.

Specifically, command signals of output torques and speeds of the first motor 4 and the second motor 5 are transmitted from the main ECU 34 to the motor ECU 35. Likewise, command signals of an output torque and a speed of the engine 3 are transmitted from the main ECU 34 to the engine ECU 36, and command signals of torque transmitting capacities (including "0") of the clutches CL1, CL2, and the brakes B1 are transmitted from the main ECU 34 to the clutch ECU 37.

The motor ECU 35 calculates current values applied to the first motor 4 and the second motor 5 based on the data transmitted from the main ECU 34, and transmits calculation results to the first motor 4 and the second motor 5 in the form of command signals. In the vehicle Ve, an AC motor is employed as the first motor 4 and the second motor 5, respectively. In order to control the AC motor, the command signal transmitted from the motor ECU 35 includes command signals for controlling a frequency of a current generated by the inverter and a voltage value boosted by the converter.

The engine ECU 36 calculates current values and pulse numbers to control opening degrees of an electronic throttle valve, an EGR (Exhaust Gas Restriction) valve, an intake valve, an exhaust valve, and an exhaust valve, and to activate an ignition plug, based on the data transmitted from the main ECU 34. Calculation results are transmitted from the engine ECU 36 to the valves and the plug in the form of command signals. Thus, the engine ECU 36 transmits command signals for controlling a power, an output torque and a speed of the engine 3. In addition, as shown in FIG. 2, the engine ECU 36 is provided with an ignition command transmitter 36a that is configured to control an ignition timing of the engine 3. For example, the ignition command transmitter 36a transmits a command signal to retard a timing of the spark to warm up the catalyst 29.

The clutch ECU 37 calculates current values supplied to actuators controlling engagement pressures of the clutches CL1, CL2, and the brake B1 based on the data transmitted from the main ECU 34, and transmits calculation results to the actuators in the form of command signals.

In the vehicle Ve, an operating mode may be selected from a hybrid mode (to be abbreviated as the "HV mode" hereinafter) in which the vehicle Ve is propelled by a drive torque generated by the engine 3, and an electric vehicle mode (to be abbreviated as the "EV mode" hereinafter) in which the vehicle Ve is propelled by drive torques generated by the first motor 4 and the second motor 5 without operating the engine 3. The HV mode may be selected from a Hybrid-Low mode (to be abbreviated as the "HV-Low mode" hereinafter), a Hybrid-High mode (to be abbreviated as the "HV-High mode" hereinafter), and a fixed mode. Specifically, in the HV-Low mode, a rotational speed of the engine 3 (i.e., a rotational speed of the input shaft 14) is increased higher than a rotational speed of the ring gear 16 of the transmission section 8 when a rotational speed of the first motor 4 is reduced to substantially zero. In turn, in the HV-High mode, a rotational speed of the engine 3 is reduced lower than a rotational speed of the ring gear 16 of the transmission section 8 when a rotational speed of the first motor 4 is reduced to substantially zero. Further, in the fixed mode, the engine 3 and the ring gear 16 of the transmission section 8 are always rotated at substantially same speeds. Here, it is to be noted that a toque amplification factor in the HV-Low mode is greater than that in the HV-High mode.

The EV mode may be selected from a dual-motor mode in which both of the first motor 4 and the second motor 5 generate drive torques to propel the vehicle Ve, and a single-motor mode (or a disconnecting mode) in which only the second motor 5 generates a drive torque to propel the vehicle Ve. Further, the dual-motor mode may be selected from an Electric Vehicle-Low mode (to be abbreviated as the "EV-Low mode" hereinafter) in which a torque of the first motor 4 is multiplied by a relatively larger factor, and an Electric Vehicle-High mode (to be abbreviated as the "EV-High mode" hereinafter) in which a torque of the first motor 4 is multiplied by a relatively smaller factor. In the single-motor mode, the vehicle Ve is powered only by the second motor 5 while disengaging both of the first clutch CL1 and the second clutch CL2, or engaging one of the first clutch CL1 and the second clutch CL2.

FIG. 3 shows engagement states of the first clutch CL1, the second clutch CL2, and the brake B1, and operating conditions of the first motor 4, the second motor 5, and the engine 3 in each operating mode. In FIG. 3, "•" represents that the engagement device is in engagement, "-" represents that the engagement device is in disengagement, "G" represents that the motor serves mainly as a generator, "M" represents that the motor serves mainly as a motor, blank represents that the motor serves as neither a motor nor a generator or that the motor is not involved in propulsion of the vehicle Ve, "ON" represents that the engine 3 generates a drive torque, and "OFF" represents that the engine 3 does not generate a drive torque.

Rotational speeds of the rotary elements of the power split mechanism 6, and directions of torques of the engine 3, the first motor 4, and the second motor 5 in each operating mode are indicated in FIGS. 4 to 9. In the nomographic diagrams shown in FIGS. 4 to 9, distances among the vertical lines represents a gear ratio of the power split mechanism 6, a vertical distance on the vertical line from the horizontal base line represents a rotational speed of the rotary member, an orientation of the arrow represents a direction of the torque, and a length of the arrow represents a magnitude of the torque.

Figure 4:
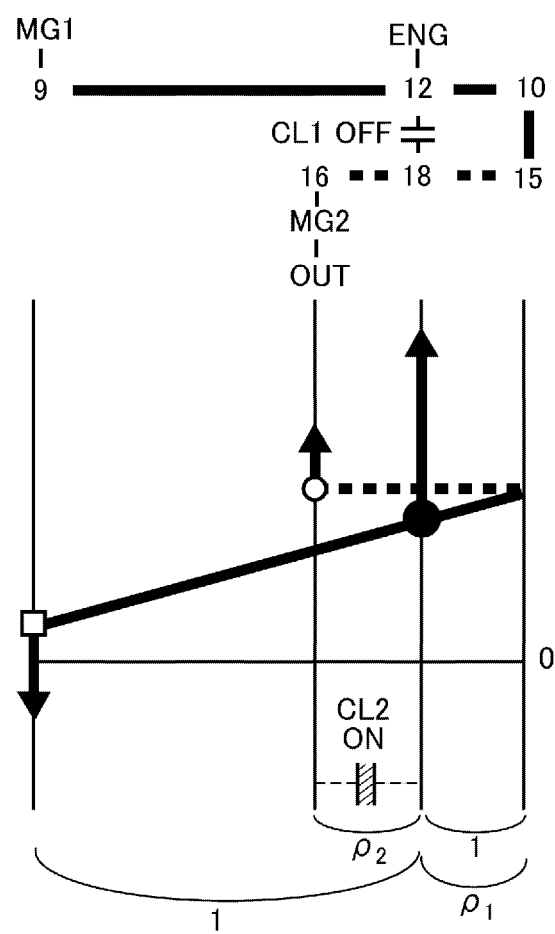
FIG. 4 is a nomographic diagram showing a situation in a HV-High mode.
Figure 5:
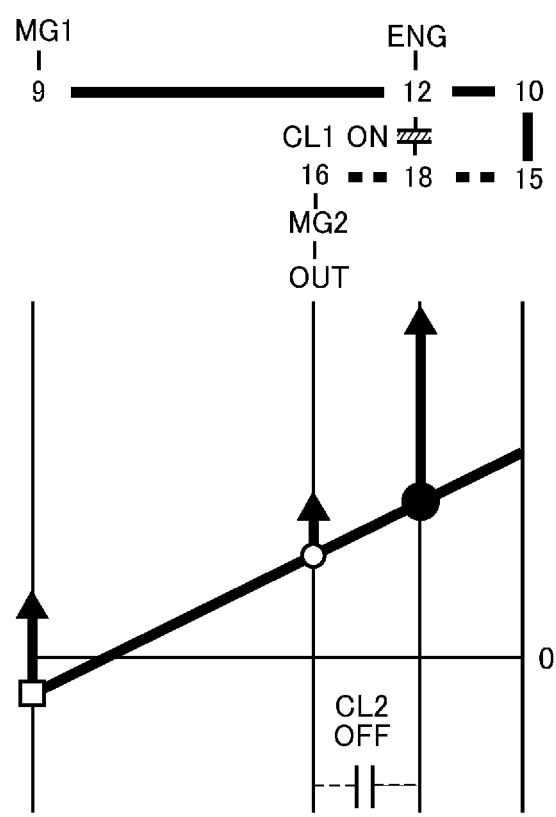
FIG. 5 is a nomographic diagram showing a situation in a HV-Low mode.

As indicated in FIG. 4, in the HV-High mode, the second clutch CL2 is engaged, and the engine 3 generates a drive torque while establishing a reaction torque by the first motor 4. As indicated in FIG. 5, in the HV-Low mode, the first clutch CL1 is engaged, and the engine 3 generates a drive torque while establishing a reaction torque by the first motor 4. In the HV-High mode and the HV-Low mode, a rotational speed of the first motor 4 is controlled in such a manner as to optimize a total energy efficiency in the drive unit 2 including a fuel efficiency of the engine 3 and a driving efficiency of the first motor 4. Specifically, the total energy efficiency in the drive unit 2 may be calculated by dividing a total energy consumption by a power to rotate the front wheels 1R and 1L. A rotational speed of the first motor 4 may be varied continuously, and the rotational speed of the engine 3 is governed by the rotational speed of the first motor 4 and a speed of the vehicle Ve. That is, the power split mechanism 6 may serve as a continuously variable transmission.

As a result of establishing a reaction torque by the first motor 4, the first motor 4 serves as a generator. In this situation, therefore, a power of the engine 3 is partially translated into an electric energy, and the remaining power of the engine 3 is delivered to the ring gear 16 of the transmission section 8. Specifically, the reaction torque established by the first motor 4 is governed by a split ratio of the torque delivered from the engine 3 to the first motor 4 side through the power split mechanism 6. Such split ratio between the torque delivered from the engine 3 to the first motor 4 side through the power split mechanism 6 and the torque delivered from the engine 3 to the ring gear 16 differs between the HV-Low mode and the HV-High mode.

Given that the torque delivered to the first motor 4 side is "1", a ratio of the torque applied to the ring gear 16 in the HV-Low mode may be expressed as "$1/(\rho 1 \cdot \rho 2)$", and a ratio of the torque applied to the ring gear 16 in the HV-High mode may be expressed as "$1/(\rho 1)$". In other words, given that the torque of the engine 3 is "1", a ratio of the torque of the engine 3 delivered to the ring gear 16 in the HV-Low mode may be expressed as "$1/(1-(\rho 1 \cdot \rho 2))$", and a ratio of the torque of the engine 3 delivered to the ring gear 16 in the HV-High mode may be expressed as "$1/(\rho 1+1)$". In the above expressions, "$\rho 1$" is a gear ratio of the power split section 7 (i.e., a ratio between teeth number of the ring gear 10 and teeth number of the sun gear 9), and "$\rho 2$" is a gear ratio of the transmission section 8 (i.e., a ratio between teeth number of the ring gear 16 and teeth number of the sun gear 15). Specifically, "$\rho 1$" and "$\rho 2$" are smaller than "1", respectively. That is, in the HV-Low mode, a ratio of the torque delivered to the ring gear 16 is increased in comparison with that in the HV-High mode.

Here, when the speed of the engine 3 is increased by increasing the torque generated by the engine 3, the output torque of the engine 3 is reduced by a torque required to increase the speed of the engine 3. In the HV mode, the electric power generated by the first motor 4 may be supplied to the second motor 5, and in addition, the electric power accumulated in the electric storage device 32 may also be supplied to the second motor 5 as necessary.

Figure 6:
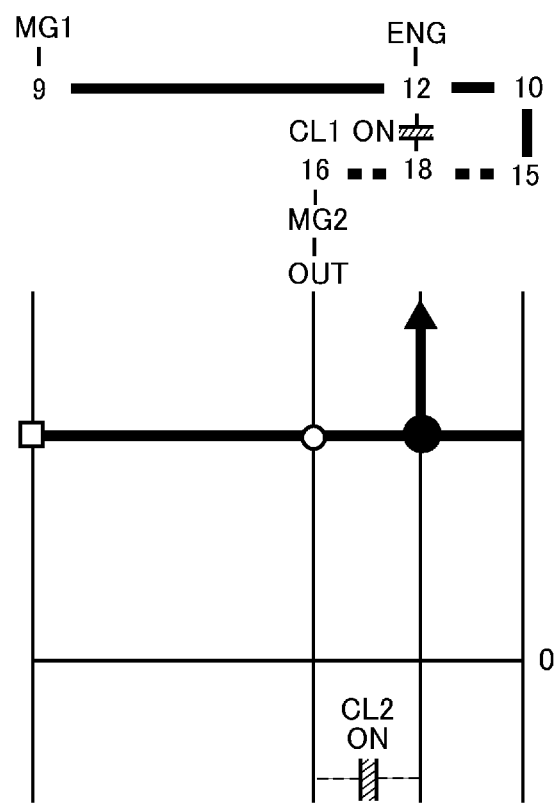
FIG. 6 is a nomographic diagram showing a situation in a fixed mode.

In the fixed mode, as indicated in FIG. 6, both of the first clutch CL1 and the second clutch CL2 are engaged so that all of the rotary elements in the power split mechanism 6 are rotated at same speeds. In other words, the output power of the engine 3 will not be translated into an electric energy by the first motor 4 and the second motor 5. For this reason, a power loss associated with such energy conversion will not be caused in the fixed mode and hence power transmission efficiency can be improved.

Figure 7:
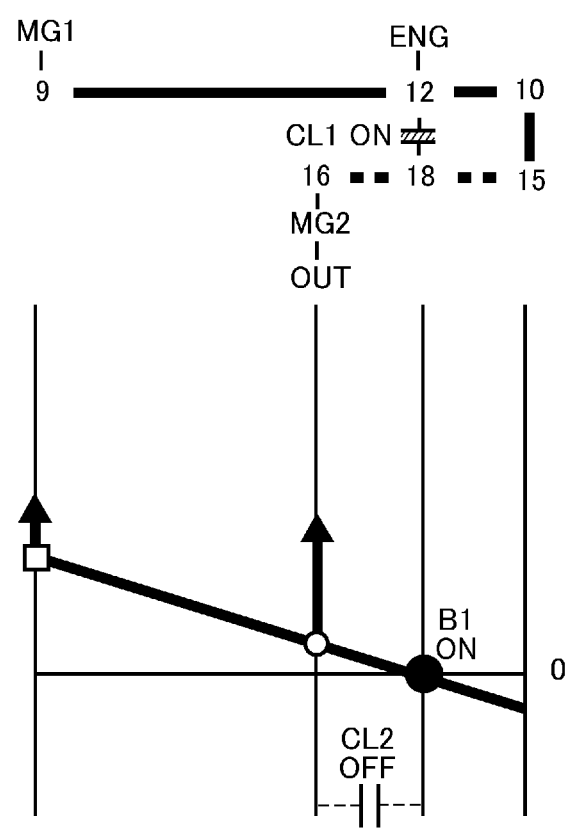
FIG. 7 is a nomographic diagram showing a situation in an EV-Low mode.
Figure 8:
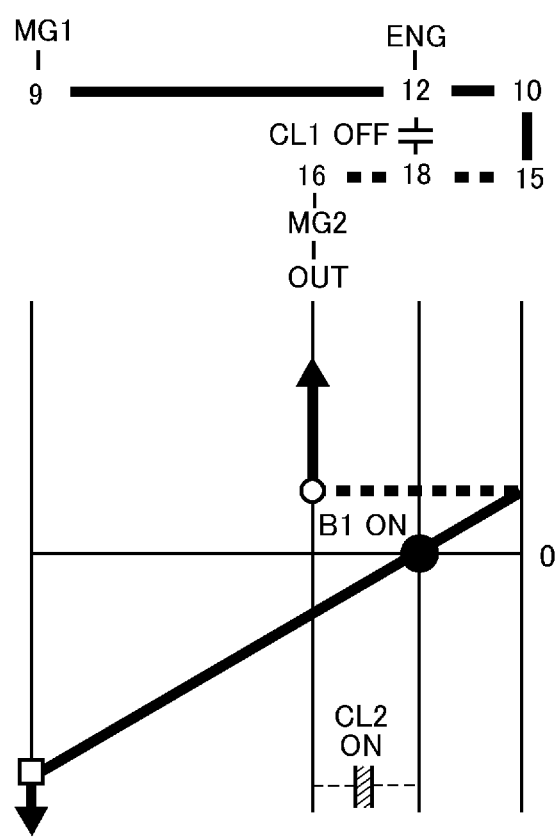
FIG. 8 is a nomographic diagram showing a situation in an EV-High mode.

As indicated in FIGS. 7 and 8, in the EV-Low mode and the EV-High mode, the brake B1 is engaged, and the first motor 4 and the second motor 5 generates the drive torques to propel the vehicle Ve. As indicated in FIG. 7, in the EV-Low mode, the vehicle Ve is propelled by the drive torques generated by the first motor 4 and the second motor 5 while engaging the brake B1 and the first clutch CL1. In this case, the brake B1 establishes a reaction torque to restrict a rotation of the output shaft 13 or the carrier 12. In the EV-Low mode, the first motor 4 is rotated in the forward direction while generating torque in a direction to increase a rotational speed. As indicated in FIG. 8, in the EV-High mode, the vehicle Ve is propelled by drive torques generated by the first motor 4 and the second motor 5 while engaging the brake B1 and the second clutch CL2. In this case, the brake B1 also establishes a reaction torque to restrict a rotation of the output shaft 13 or the carrier 12. In the EV-High mode, the first motor 4 is rotated in the opposite direction (i.e., in a reverse direction) to the rotational direction of the engine 3 in the HV mode, while generating torque in a direction to increase a rotational speed.

Figure 9:
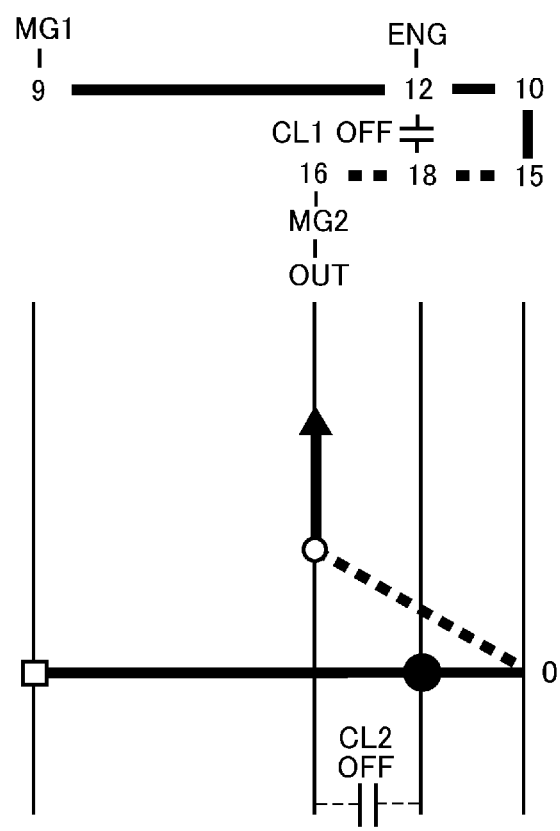
FIG. 9 is a nomographic diagram showing a situation in a single-motor mode.

In the EV-Low mode, a ratio of a rotational speed of the ring gear 16 of the transmission section 8 to a rotational speed of the first motor 4 is reduced smaller than that in the EV-High mode. That is, in the EV-Low mode, the rotational speed of the first motor 4 at a predetermined speed is increased higher than that in the EV-High mode. In other words, a speed reducing ratio in the EV-Low mode is greater than that in the EV-High mode. In the EV-Low mode, therefore, a larger drive force may be generated. Here, in the drive unit 2 shown in FIG. 1, the rotational speed of the ring gear 16 corresponds to a rotational speed of an output member, and the following explanation will be made on the assumption that a gear ratio among each member from the ring gear 16 to the front wheels 1R and 1L is "1" for the sake of convenience. As indicated in FIG. 9, in the single-motor mode, only the second motor 5 generates a drive torque, and both of the first clutch CL1 and the second clutch CL2 are disengaged. In the single-motor mode, therefore, all of the rotary elements of the power split mechanism 6 are stopped. For this reason, the engine 3 and the first motor 4 will not be rotated passively, and hence the power loss can be reduced.

In the vehicle Ve, the operating mode is selected on the basis of an SOC level of the electric storage device 32, a vehicle speed, a required drive force and so on. According to the embodiment, a control mode of the electric storage device 32 may be selected from a Charge Sustaining mode (to be abbreviated as the "CS mode" hereinafter) in which the operating mode is selected in such a manner as to maintain the SOC level of the electric storage device 32 as far as possible, and a Charge Depleting mode (to be abbreviated as the "CD mode" hereinafter) in which the operating mode is selected in such a manner as to propel the vehicle Ve while consuming the electric power accumulated in the electric storage device 32. Specifically, the CS mode is selected when the SOC level of the electric storage device 32 is relatively low, and the CD mode is selected when the SOC level of the electric storage device 32 is relatively high. Accordingly, the CS mode corresponds to a "first mode" of the embodiment of the present disclosure, and the CD mode corresponds to a "second mode" of the embodiment of the present disclosure.

Figure 10:
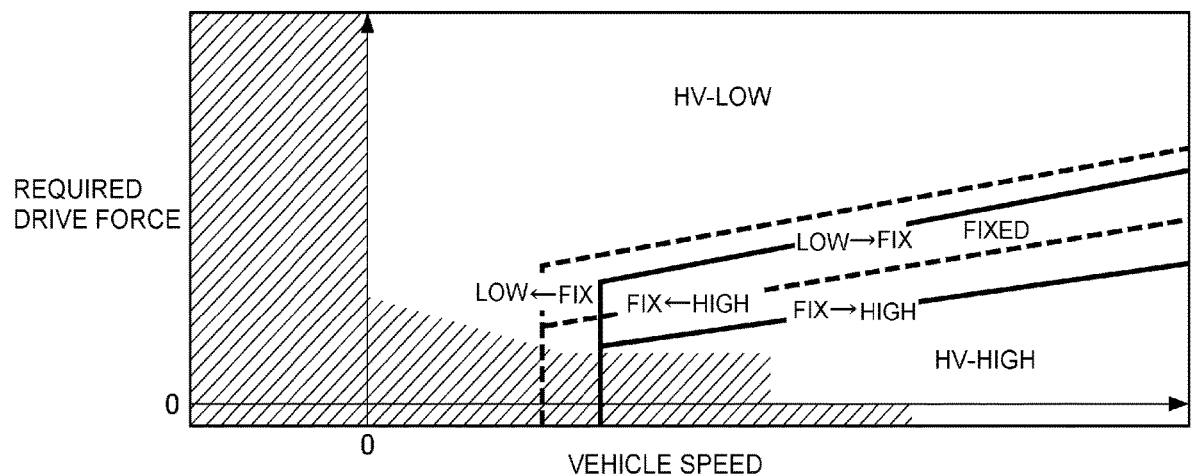
FIG. 10 shows a map for determining an operating mode during propulsion in a CS mode.

FIG. 10 shows an example of a map for selecting the operating mode during propulsion in the CS mode. In FIG. 10, the vertical axis represents a required drive force, and the horizontal axis represents a vehicle speed. In order to select the operating mode of the vehicle Ve, the vehicle speed may be detected by the vehicle speed sensor, and the required drive force may be estimated based on an accelerator position detected by the accelerator sensor.

In FIG. 10, the hatched region is an area where the single-motor mode is selected. In the CS mode, the single-motor mode is selected when the vehicle Ve is propelled in a reverse direction irrespective of the required drive force, and when the vehicle Ve is propelled in a forward direction and the required drive force is small (or when decelerating).

During forward propulsion in the CS mode, the HV mode is selected when a large drive force is required. In the HV mode, the drive force may be generated from a low speed range to a high speed range. When the SOC level of the electric storage device 32 falls close to a lower limit level, therefore, the HV mode may be selected even if an operating point governed by the required drive force and the vehicle speed falls within the hatched region.

As described, the HV mode may be selected from the HV-Low mode, the HV-High mode, and the fixed mode. In the CS mode, specifically, the HV-Low mode is selected when the vehicle speed is relatively low and the required drive force is relatively large, the HV-High mode is selected when the vehicle speed is relatively high and the required drive force is relatively small, and the fixed mode is selected when the operating point falls between a region where the HV-Low mode is selected and a region where the HV-High mode is selected.

In the CS mode, the operating mode is shifted from the fixed mode to the HV-Low mode when the operating point is shifted across the "Low←Fix" line from right to left, or when the operating point is shifted across the "Low←Fix" line upwardly from the bottom. By contrast, the operating mode is shifted from the HV-Low mode to the fixed mode when the operating point is shifted across the "Low→Fix" line from left to right, or when the operating point is shifted across the "Low→Fix" line downwardly from the top. Likewise, the operating mode is shifted from the HV-High mode to the fixed mode when the operating point is shifted across the "Fix←High" line from right to left, or when the operating point is shifted across the "Fix←High" line upwardly from the bottom. By contrast, the operating mode is shifted from the fixed mode to the HV-High mode when the operating point is shifted across the "Fix→High" line from left to right, or when the operating point is shifted across the "Fix→High" line downwardly from the top.

Figure 11:
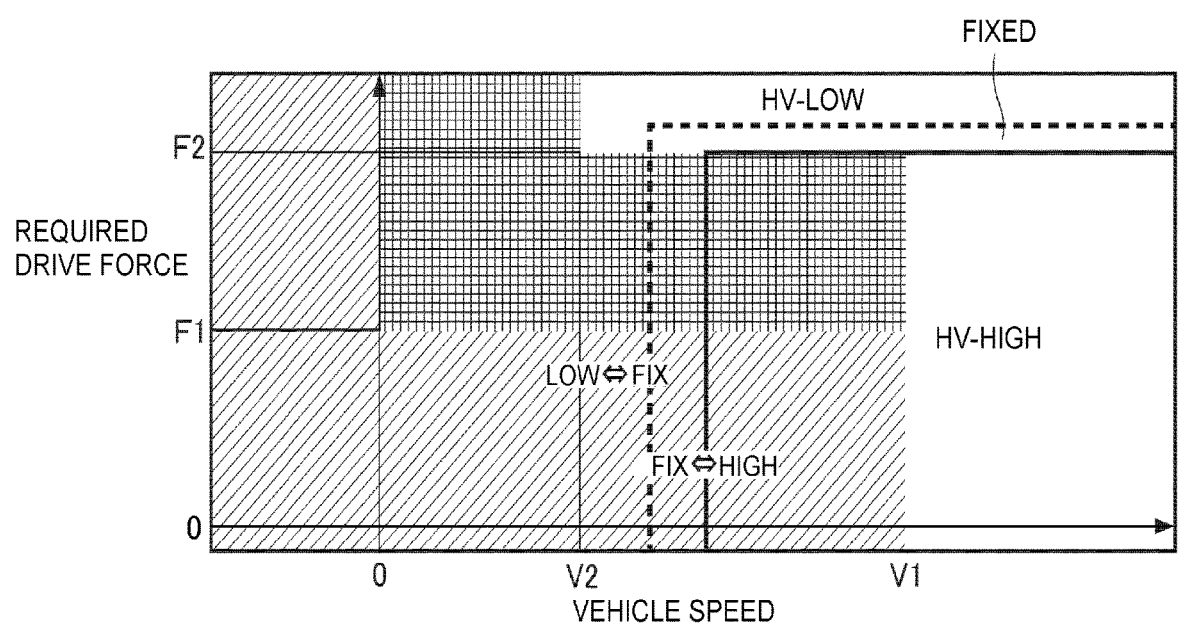
FIG. 11 shows a map for determining an operating mode during propulsion in a CD mode.

FIG. 11 shows an example of a map for selecting the operating mode during propulsion in the CD mode. In FIG. 11, the vertical axis also represents the required drive force, and the horizontal axis also represents the vehicle speed.

In FIG. 11, the hatched region is also an area where the single-motor mode is selected. In the CD mode, the single-motor mode is also selected when the vehicle Ve is propelled in the reverse direction irrespective of the required drive force, and when the vehicle Ve is propelled in the forward direction and the required drive force is smaller than a first threshold force value F1 (or when decelerating). Such region where the single-motor mode is selected is determined based on specifications of the second motor 5 and so on.

During forward propulsion in the CD mode, the dual-motor mode is selected when the drive force larger than a first threshold force value F1 is required. In this case, the HV mode is selected when the vehicle speed is higher than a first threshold speed V1, or when the vehicle speed is higher than a second threshold speed V2 and the required drive force is greater than a second threshold force value F2. As described, in the HV mode, the drive force may be generated from the low speed range to the high speed range. When the SOC level of the electric storage device 32 falls close to the lower limit level, therefore, the HV mode may be selected even if the operating point falls within the regions where the single-motor mode and the dual-motor mode are selected.

In the CD mode, the HV-Low mode is also selected when the vehicle speed is relatively low and the required drive force is relatively large, the HV-High mode is also selected when the vehicle speed is relatively high and the required drive force is relatively small, and the fixed mode is also selected when the operating point falls between the region where the HV-Low mode is selected and the region where the HV-High mode is selected.

In the CD mode, specifically, the operating mode is shifted between the fixed mode and the HV-Low mode when the operating point is shifted across the "Low↔Fix" line. Likewise, the operating mode is shifted between the HV-High mode and the fixed mode when the operating point is shifted across the "Fix↔High".

In the maps shown in FIGS. 10 and 11, the regions of each of the operating mode and the lines defining the regions may be altered depending on temperatures of the members of the drive unit 2, the electric storage device 32, the power control systems 30 and 31, and an SOC level of the electric storage device 32.

In a case of starting the engine 3 at a low temperature, it is necessary to raise a temperature of the catalyst 29 to the activation temperature. In general, in order to warm up the catalyst 29, an ignition timing of the engine 3 is retarded. Consequently, combustion takes place during exhaust stroke so that a temperature of the catalyst is raised promptly to the activation temperature by a high-temperature exhaust gas.

However, in the vehicle Ve shown in FIG. 1, the engine 3 is connected to the first motor 4 through the first clutch CL1 (and the second clutch CL2). Therefore, if the catalyst 29 is warmed by retarding an ignition timing of the engine 3, a torque of the engine 3 may be changed significantly by an inertial load of the first motor 4 to disturb the behavior of the vehicle Ve. In order to reduce a change in the torque of the engine 3 when warming the catalyst 29, the ECU 33 is configured to execute a routine shown in FIG. 12.

At step S1, it is determined whether the warm-up of the catalyst 29 is required. In other words, it is determined at step S1 whether it is necessary to raise a temperature of the catalyst 29 to the activation temperature. For example, such determination at step S1 may be made by the temperature comparator 34a that compares a temperature of the catalyst 29 detected by the catalyst temperature sensor with the activation temperature of the catalyst 29.

If the temperature of the catalyst 29 is lower than the activation temperature so that the answer of step S1 is YES, the routine progresses to step S2 to determine whether the engine 3 is in a self-sustaining condition (e.g., the engine 3 is idling). In order to warm-up the catalyst 29, it is necessary to operate the engine 3. Therefore, if the engine 3 is not in the self-sustaining condition, it is necessary to operate the engine 3 at least at a self-sustaining speed. To this end, if the engine 3 is not in the self-sustaining condition so that the answer of step S2 is NO, the routine progresses to step S3 to crank the engine 3 by the first motor 4. Specifically, a rotational speed of the engine 3 is raised to the self-sustaining speed by generating a torque in a counter direction by the first motor 4.

If the engine 3 is in the self-sustaining condition so that the answer of step S2 is YES, or after starting up the engine 3 at step S3, the routine progresses to step S4 to determine whether the first motor 4 is disconnected from the engine 3.

After starting the engine 3, it is preferable to raise the temperature of the catalyst 29 promptly to the activation temperature. For example, as known in the art, the warm-up of the catalyst 29 may be expedited by retarding the ignition timing of the engine 3 to raise a temperature of exhaust gas. However, if the first motor 4 is connected to the engine 3 in a torque transmittable condition, the first motor 4 will be rotated passively while the catalyst 29 is warmed up. In this case, therefore, the output torque will be changed significantly by retarding the ignition timing of the engine 3. In order to avoid such disadvantage, according to the exemplary embodiment of the present disclosure, torque transmission between the first motor 4 and the engine 3 is interrupted when retarding the ignition timing of the engine 3. To this end, if the first motor 4 is connected to the engine 3 so that the answer of step S4 is NO, the routine progresses to step S5 to disconnect the first motor 4 from the engine 3. In the case that the first motor 4 is connected to the engine 3, at least one of the first clutch CL1 and the second clutch CL2 is in engagement. In this case, therefore, the first clutch CL1 or the second clutch CL2 currently in engagement is disengaged at step S5. For example, if the vehicle Ve is in the HV-Low mode, the first clutch CL1 is disengaged. By contrast, if the vehicle Ve is in the HV-High mode, the second clutch CL2 is disengaged.

After disconnecting the first motor 4 from the engine 3, the routine progresses to step S6 to retard the ignition timing of the engine 3 by the ignition command transmitter 36a. In this situation, since the first motor 4 has already been disconnected from the engine 3, a change in the output torque of the engine 3 is relatively small even if the ignition timing of the engine 3 is retarded. Specifically, the ignition timing may be retarded to such an extent that the catalyst 29 is not thermally damaged.

Likewise, if the first motor 4 is disconnected from the engine 3 so that the answer of step S4 is YES, the routine also progresses to step S6 to retard the ignition timing of the engine 3.

By contrast, if the temperature of the catalyst 29 is equal to or higher than the activation temperature, it is not necessary to warm up the catalyst 29. If the warm-up of the catalyst 29 is not required so that the answer of step S1 is NO, the routine progresses to step S7 to control the engine 3, the first motor 4 and the second motor 5, and the first clutch CL1 and the second clutch CL2 in a normal manner depending on a current running condition of the vehicle Ve.

Figure 12:
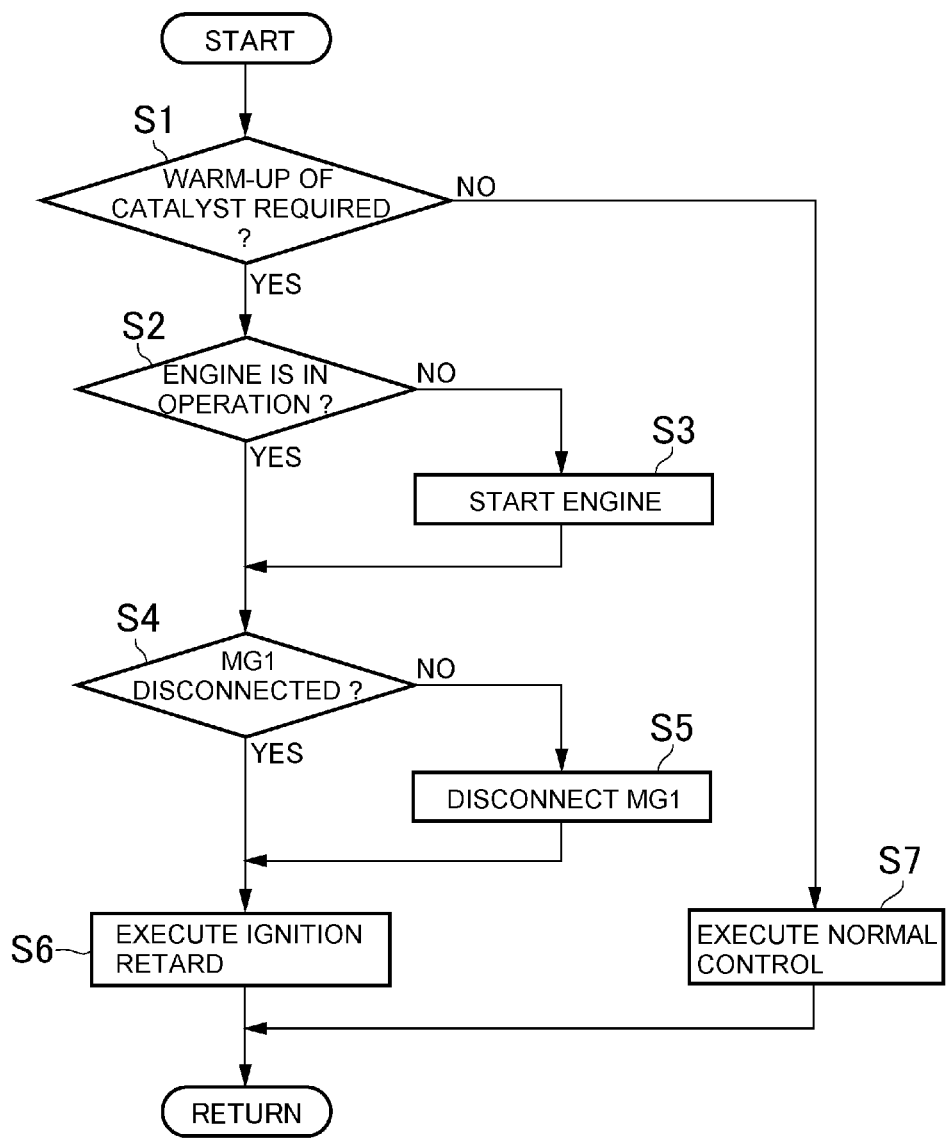
FIG. 12 is a flowchart showing one example of a routine executed by the control system according to the embodiment of the present disclosure.
Figure 13:
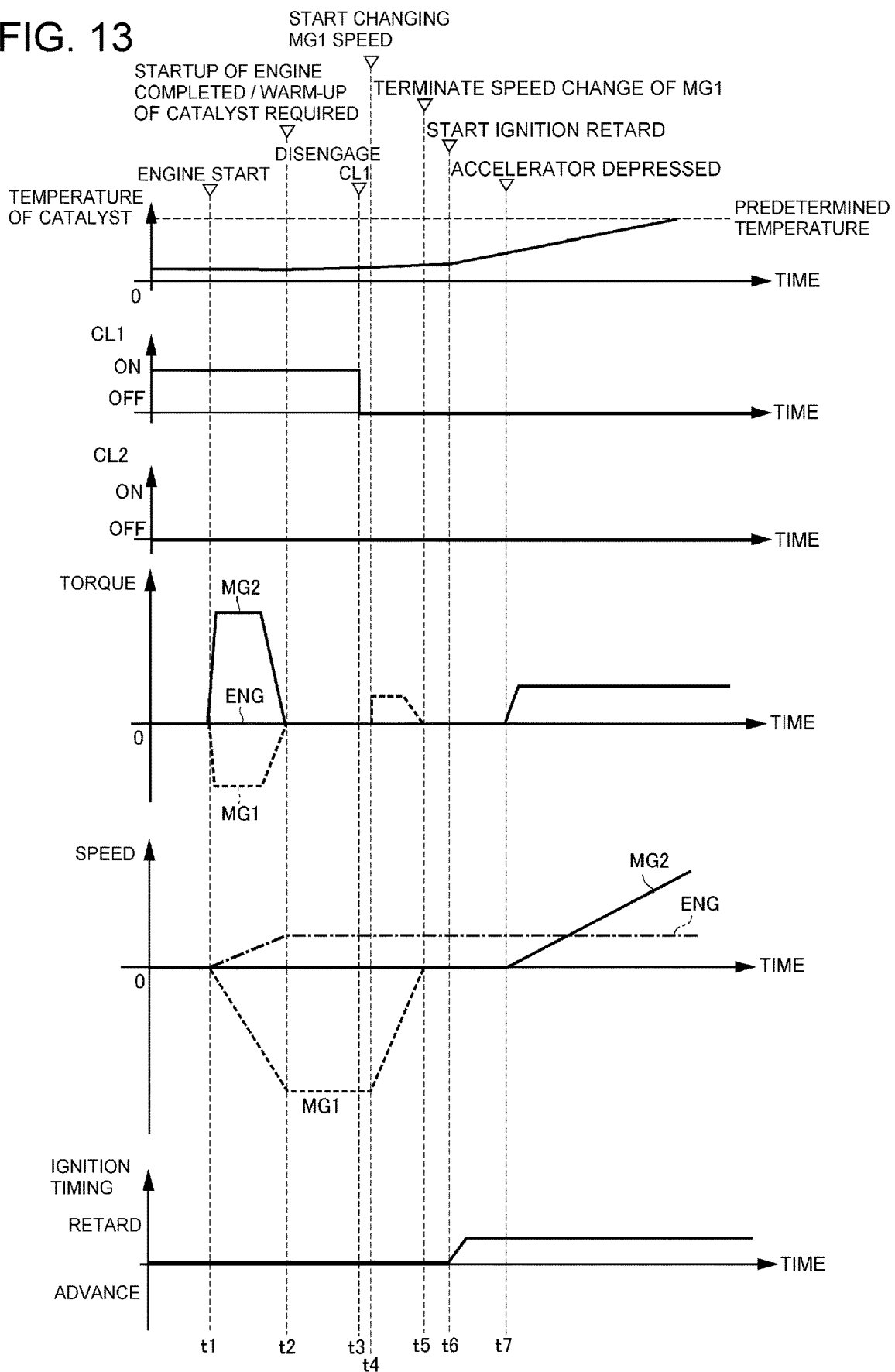
FIG. 13 is a time chart indicating a temporal change in the situation of the hybrid vehicle during execution of the routine shown in FIG. 12.

Turing to FIG. 13, there are shown temporal changes in conditions of the vehicle Ve during execution of the routine shown in FIG. 12. Specifically, FIG. 13, shows a situation in which the vehicle Ve is in a ready-on condition to be launched and the catalyst 29 will be warmed up.

Basically, the vehicle Ve being stopped is in the HV-Low mode. In this situation, therefore, the first clutch CL1 is in engagement and the second clutch CL2 is in disengagement. At point t1, the catalyst temperature sensor detects a fact that a temperature of the catalyst 29 is lower than the activation temperature, and the engine 3 is started. As described, the engine 3 is started by increasing a rotational speed of the engine 3 to the self-sustaining speed by the first motor 4. To this end, the first motor 4 generates a torque in an opposite direction to a rotational direction of the engine 3 (i.e., a negative torque), and consequently a speed of the first motor 4 is increased in the counter direction from point t1 to point t2. In this situation, the negative torque is applied to the output member, therefore, a torque of the second motor 5 is increased to cancel the negative torque. In FIG. 13, a value calculated by converting the torque of the second motor 5 into a shaft torque of the ring gear is indicated as the torque of the second motor 5.

At point t2, the speed of the engine 3 reaches the self-sustaining speed, and hence the torque of the first motor 4 is reduced to zero. Then, at point t3, the first clutch CL1 is disengaged to disconnect the first motor 4 from the engine 3. Consequently, the first motor 4 is prevented from being rotated passively by a rotation of the engine 3, and the engine 3 will be no longer subjected to the inertial load of the first motor 4 when warming the catalyst 29. After disengaging the first clutch CL1, the rotational speed of the first motor 4 is reduced toward zero from point t4 to point t5.

After the rotational speed of the first motor 4 has been reduced to zero, the ignition retard of the engine 3 is commenced at point t6 thereby expediting the warm-up of the catalyst 29. By thus retarding the ignition timing, combustion of the engine 3 takes place during exhaust stroke so that the exhaust gas whose temperature is high is introduced to the catalyst 29. As a result, the temperature of the catalyst 29 may be raised promptly to the activation temperature. To this end, a retarding amount of the ignition timing may be determined based on the current temperature of the catalyst 29. As described, according to the example shown in FIG. 13, the first clutch CL1 is disengaged to disconnect the first motor 4 from the engine 3. Therefore, the torque of the engine 3 is not changed significantly by the inertial load of the first motor 4 during execution of the ignition retard. For this reason, in order to rapidly raise the temperature of the catalyst 29, the ignition timing may be retarded to such an extent that the catalyst 29 is not thermally damaged.

Thus, according to the example shown in FIG. 13, the ignition retard of the engine 3 is commenced after reducing the rotational speed of the first motor 4 to zero. However, the ignition retard of the engine 3 may also be commenced from point t4 simultaneously with the reduction in the rotational speed of the first motor 4.

Thereafter, an accelerator pedal (not shown) is depressed at point t7 to generate a torque by the second motor 5. Consequently, the vehicle Ve is launched in the EV mode (i.e., the single-motor mode).

Thus, according to the exemplary embodiment of the present disclosure, the ignition timing of the engine 3 is retarded when warming the catalyst 29. Consequently, combustion of the engine 3 takes place during exhaust stroke so that the high-temperature exhaust gas is delivered to the catalyst 29 thereby raising the temperature of the catalyst 29 rapidly to the activation temperature. In addition, for the preparation of the ignition retard, the first clutch CL1 is disengaged to disconnect the first motor 4 from the engine 3 when the rotational speed of the engine 3 is raised to the self-sustaining speed. Therefore, the first motor 4 will not be rotated passively by the rotation of the engine 3 during the warm-up of the catalyst 29. In other words, the torque of the engine 3 will not be changed significantly by the inertial load of the first motor 4 during execution of the ignition retard. For this reason, the ignition timing may be retarded to such an extent that the catalyst 29 is not thermally damaged so that the temperature of the catalyst 29 can be raised rapidly.

Moreover, since the torque of the engine 3 will not be changed significantly during the warm-up of the catalyst 29, misfire of the engine 3 may be determined accurately based on a change in a rotation of the crankshaft.

Further, the behavior of the vehicle Ve may be stabilized during the warm-up of the catalyst 29. Furthermore, since the warm-up of the catalyst 29 can be completed promptly, an energy efficiency of the engine 3 is improved to reduce fuel consumption.

In addition, according to the exemplary embodiment of the present disclosure, the second motor 5 generates the torque to launch the vehicle Ve when the accelerator pedal is depressed. That is, although the vehicle Ve may not be powered by the engine 3 when warming the catalyst 29 while disengaging the first clutch CL1, the vehicle Ve may be launched in the EV mode while supplying electricity from the electric storage device 32 to the second motor 5.

Figure 14:
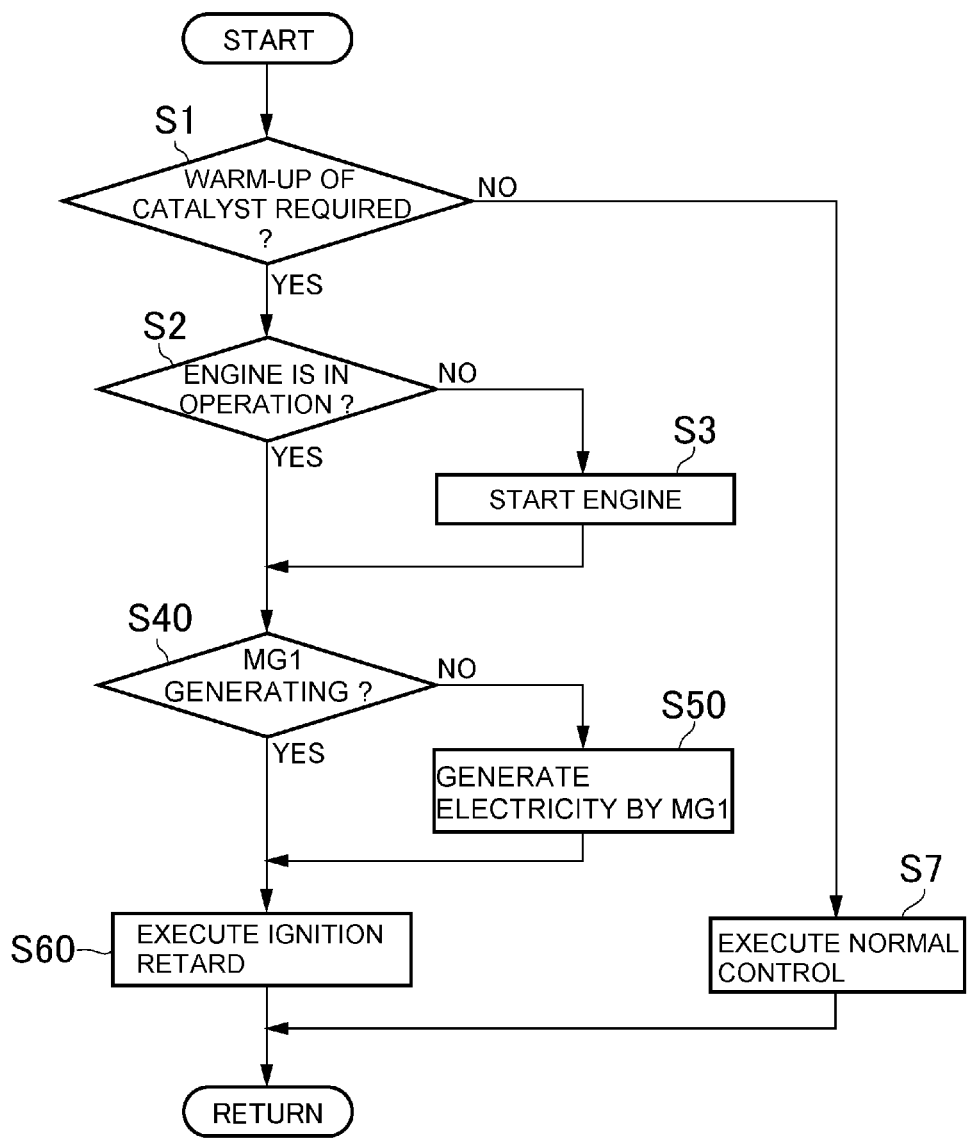
FIG. 14 is a flowchart showing another example of a routine executed by the control system according to the embodiment of the present disclosure.

Next, here will be explained another example of the routine executed by control system according to the present disclosure with reference to FIG. 14. As described, according the foregoing example, the drive force to launch the vehicle Ve is generated by the second motor 5 when the accelerator pedal is depressed. However, the drive force possible to be generated in the EV mode is restricted depending on an SOC level of the electric storage device 32 and the control mode of the electric storage device 32. For example, the engine 3 generates the drive force to launch the vehicle Ve when the SOC level of the electric storage device 32 is low, or when the CS mode is selected to maintain the SOC level of the electric storage device 32. Therefore, the routine shown in FIG. 14 is executed to generate the drive force to propel the vehicle Ve by the engine 3 while warming the catalyst 29, when the drive force possible to be generated in the EV mode is restricted smaller than a predetermined value.

In the following explanations, detailed explanations for the steps in common with those in the routine shown in FIG. 12 will be simplified. At step S1, it is determined whether the warm-up of the catalyst 29 is required by comparing a temperature of the catalyst 29 with the activation temperature. If the temperature of the catalyst 29 is lower than the activation temperature so that the answer of step S1 is YES, the routine progresses to step S2 to determine whether the engine 3 is in a self-sustaining condition. If the engine 3 is not in the self-sustaining condition so that the answer of step S2 is NO, the routine progresses to step S3 to raise a rotational speed of the engine 3 to the self-sustaining speed by the first motor 4.

If the engine 3 is in the self-sustaining condition so that the answer of step S2 is YES, or after starting up the engine 3 at step S3, the routine progresses to step S40 to determine whether the first motor 4 is generating electricity. As described, the routine shown in FIG. 14 is executed in the case that the SOC level of the electric storage device 32 is low, and in this case, it is necessary to propel (or launch) the vehicle Ve by the drive force of the engine 3 while engaging the first clutch CL1 to connect the first motor 4 to the engine 3. According to another example, therefore, the SOC level of the electric storage device 32 is raised by generating electricity by the first motor 4.

Specifically, if the first motor 4 is not generating electricity so that the answer of step S40 is NO, the routine progresses to step S50 to operate the first motor 4 as a generator by rotating the first motor 4 by the torque of the engine 3. For example, the electricity generated by the first motor 4 may be supplied to the electric storage device 32 to raise the SOC level of the electric storage device 32. In this situation, it is necessary to raise the temperature of the catalyst 29 promptly to the activation temperature. To this end, the routine progresses to step S60 to retard the ignition timing of the engine 3. Consequently, an air-intake to the engine 3 is increased to raise the temperature of the exhaust gas, and the high-temperature exhaust gas is introduced to the catalyst 29.

By contrast, if the first motor 4 is generating electricity so that the answer of step S40 is YES, the routine progresses directly to step S60 to retard the ignition timing of the engine 3 thereby raising the temperature of the catalyst 29 promptly to the activation temperature. According to another example, as described, the first clutch CIA is engaged to connect the first motor 4 to the engine 3. That is, the first motor 4 is rotated passively by the engine 3, and the output torque of the engine 3 may be changed by the inertial load of the first motor 4 being rotated. Therefore, in order not to change the output torque of the engine 3 significantly by the inertial load of the first motor 4, the retarding amount of the ignition timing in the routine shown in FIG. 14 is reduced in comparison with that in the routine shown in FIG. 12.

Figure 15:
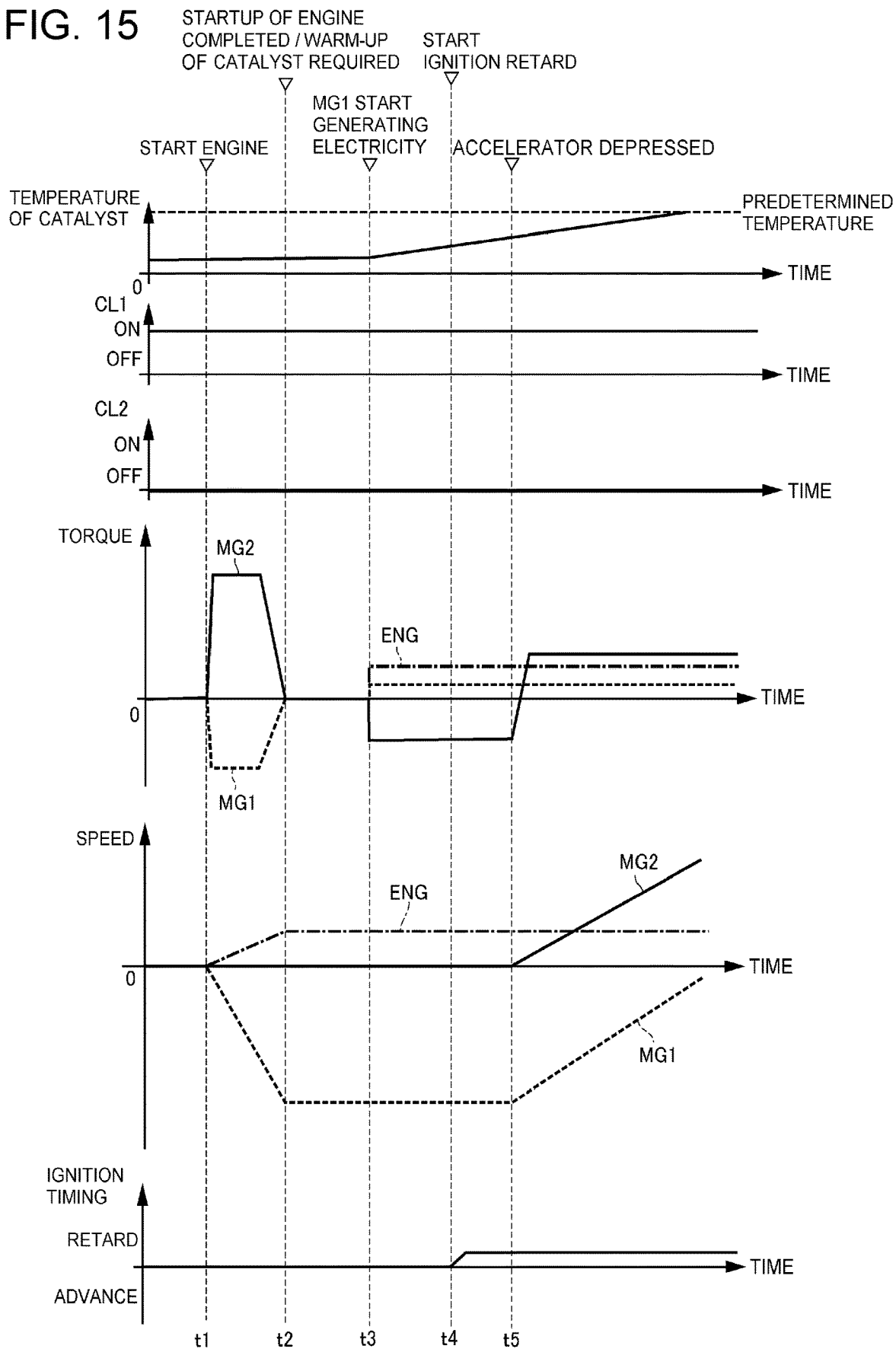
FIG. 15 is a time chart indicating a temporal change in the situation of the hybrid vehicle during execution of the routine shown in FIG. 14.

Turing to FIG. 15, there are shown temporal changes in conditions of the vehicle Ve during execution of the routine shown in FIG. 14. Specifically, FIG. 15, shows a situation in which the vehicle Ve is in a ready-on condition to be launched and the catalyst 29 will be warmed up.

As described, the vehicle Ve being stopped is basically in the HV-Low mode. In this situation, therefore, the first clutch CL1 is in engagement and the second clutch CL2 is in disengagement. At point t1, the catalyst temperature sensor detects a fact that a temperature of the catalyst 29 is lower than the activation temperature, and the engine 3 is started. As described, the engine 3 is started by increasing a rotational speed of the engine 3 to the self-sustaining speed by the first motor 4. To this end, the first motor 4 generates a torque in an opposite direction to a rotational direction of the engine 3 (i.e., a negative torque), and consequently a speed of the first motor 4 is increased in the counter direction from point t1 to point t2. In this situation, the negative torque is applied to the output member, therefore, a torque of the second motor 5 is increased to cancel the negative torque. When the speed of the engine 3 reaches the self-sustaining speed at point t2, the torque of the first motor 4 is reduced to zero.

After starting the engine 3, at point t3, the first motor 4 starts generating a torque in the forward direction, and an output torque of the engine 3 is increased. Consequently, the first motor 4 starts generating electricity, and an air-intake to the engine 3 is increased so that a temperature of the exhaust gas is raised. Therefore, the temperature of the catalyst 29 is raised from point t3. Instead, the power generation of the first motor 4 may also be started from point t2 at which the startup of the engine 3 is completed.

Then, the ignition retard of the engine 3 is commenced at point t4. As described, in the case of executing the routine shown in FIG. 14, the first clutch CL1 is engaged to connect the first motor 4 to the engine 3. In the example shown in FIG. 15, therefore, the retarding amount of the ignition timing is reduced in comparison with that in the example shown in FIG. 13, in order not to change the output torque of the engine 3 significantly by the inertial load of the first motor 4. In addition, by thus reducing the retarding amount of the ignition timing, misfire of the engine 3 will not be determined erroneously. While the first motor 4 generates the torque from point t3 to point t5, the torque of the engine 3 is delivered to the output member. Therefore, in order to cancel the torque of the first motor 4, the second motor 5 generates a negative torque from point t3 to point t5.

Thereafter, when the accelerator pedal is depressed at point t5, the torque of the second motor 5 is increased to launch the vehicle Ve. In this situation, if the accelerator pedal is further depressed, the torque of the engine 3 is increased to achieve a required drive force. Since the first clutch CL1 is engaged to connect the first motor 4 to the engine 3, according to the example shown in FIG. 15, the required drive force may be achieved promptly.

Thus, the routine according to another example is executed in the case that the SOC level of the electric storage device 32 is low and hence the drive force possible to be generated in the EV mode is restricted. In this case, the first clutch CL1 is maintained in engagement to connect the first motor 4 to the engine 3, and the first motor 4 is driven by the engine 3 to generate electricity before launching the vehicle Ve. Then, the ignition timing of the engine 3 is retarded to deliver the high-temperature exhaust gas to the catalyst 29. According to another example, therefore, the electric storage device 32 may be charged with the electricity generated by the first motor 4, and the catalyst 29 may be warmed promptly. In this case, since the retarding amount of the ignition timing is reduced, misfire of the engine 3 may be determined accurately.

In addition, since the first clutch CL1 is engaged to connect the first motor 4 to the engine 3, the required drive force may be achieved promptly by the engine 3 even if the required drive force is further increased.

Although the above exemplary embodiments of the present disclosure have been described, it will be understood by those skilled in the art that the present disclosure should not be limited to the described exemplary embodiments, and various changes and modifications can be made within the scope of the present disclosure. For example, in a case that the vehicle Ve is stopped in the High mode, the second clutch CL2 may also be disconnected from the engine 3 when warming the catalyst 29.

In addition, the routine shown in FIG. 12 may be executed not only in a case that the SOC level of the electric storage device 32 is higher than a predetermined level, but also in a case that the CD mode is selected to propel the vehicle Ve while consuming the electric power accumulated in the electric storage device 32. In those cases, since none of the first clutch CL1 and the second clutch CL2 is in engagement, the retarding amount of the ignition timing may be increased according to need.

Further, the retarding amount of the ignition timing may be determined depending on the situation with reference to a specific map. In this case, a control to determine the retarding amount of the ignition timing may be simplified. For example, if the required drive force is increased during ignition retard and hence the clutch being disengaged is required to be engaged, the retarding amount may be reduced. By contrast, if the required drive force is reduced during ignition retard and hence the clutch being engaged is required to be disengaged, the retarding amount may be increased.

Furthermore, given that the wet-type multiple plate clutch is employed as the clutch, a torque transmitting capacity of the clutch may be reduced when warming the catalyst 29, instead of disconnecting the clutch completely. For example, the torque transmitting capacity of the clutch may be reduced in accordance with the SOC level of the electric storage device 32.

What is claimed is:

1. A control system for a hybrid vehicle, comprising:
   an engine serving as a prime mover;
   a purifying device that purifies an exhaust gas emitted from the engine;
   a first motor having a generating function;
   a differential mechanism having at least three rotary elements; and
   an engagement device that selectively connects the first motor to the engine,
   wherein the engine is connected to one of the rotary elements,
   the first motor is connected to another one of the rotary elements,
   the first motor is rotated passively by a rotation of the engine when the engagement device is in engagement,
   the control system comprises a controller that controls the hybrid vehicle,
   the controller is configured to
   determine whether it is necessary to warm the purifying device, and
   disengage the engagement device and retard an ignition timing of the engine when it is necessary to warm the purifying device.

2. The control system for the hybrid vehicle as claimed in claim 1, further comprising:
a temperature sensor that detects a temperature of the purifying device;
a temperature comparator that compares the temperature of the purifying device detected by the temperature sensor with an activation temperature of the purifying device; and
an ignition command transmitter that controls the ignition timing of the engine,
wherein the controller is further configured to determine that it is necessary to warm the purifying device, when the temperature comparator determines that the temperature of the purifying device detected by the temperature sensor is lower than the activation temperature.

3. The control system for the hybrid vehicle as claimed in claim 2, wherein the controller is further configured to
determine whether the engine is in a self-sustaining condition when it is necessary to warm the purifying device,
raise a speed of the engine to a self-sustaining speed by the first motor when the engine is not in the self-sustaining condition, and
disengage the engagement device after raising the speed of the engine to the self-sustaining speed.

4. The control system for the hybrid vehicle as claimed in claim 1,
wherein the prime mover includes a second motor,
the second motor is connected to an output member, and
the controller is further configured to generate a drive force by the second motor when an accelerator pedal is depressed during warm-up of the purifying device.

5. The control system for the hybrid vehicle as claimed in claim 4, wherein the controller is further configured to engage the engagement device and retard the ignition timing of the engine, when the drive force possible to be generated by the second motor is equal to or less than a predetermined value.

6. The control system for the hybrid vehicle as claimed in claim 5, wherein the controller is further configured to increase a retarding amount of the ignition timing when the engagement device is disengaged, compared to that of a case in which the engagement device is engaged.

7. The control system for the hybrid vehicle as claimed in claim 5, wherein the controller is further configured to rotate the first motor by the engine to generate electricity when warming the purifying device while engaging the engagement device.

8. The control system for the hybrid vehicle as claimed in claim 5, further comprising:
an electric storage device that is electrically connected to the first motor and the second motor,
wherein the controller is further configured to
determine that the drive force possible to be generated by the second motor is equal to or less than the predetermined value when a state of charge level of the electric storage device is equal to or lower than a predetermined level,
engage the engagement device when the state of charge level of the electric storage device is equal to or lower than the predetermined level, and
disengage the engagement device when the state of charge level of the electric storage device is higher than the predetermined level.

9. The control system for the hybrid vehicle as claimed in claim 5, further comprising:
an electric storage device that is electrically connected to the first motor and the second motor,
wherein the controller is further configured to
select a control mode of the electric storage device from a first mode in which a state of charge level of the electric storage device is maintained as far as possible, and a second mode in which the hybrid vehicle is propelled while consuming an electric power accumulated in the electric storage device,
disengage the engagement device when the first mode is selected, and
engage the engagement device when the second mode is selected.

10. The control system for the hybrid vehicle as claimed in claim 1, wherein the controller is further configured to engage the engagement device when it is not necessary to warm the purifying device.

11. The control system for the hybrid vehicle as claimed in claim 1,
wherein the differential mechanism includes
a first differential mechanism that performs a differential action among a first rotary element that is connected to the engine, a second rotary element that is connected to the first motor, and a third rotary element that transmits torque to a pair of drive wheels, and
a second differential mechanism that performs a differential action among a fourth rotary element that is connected to an output member, a fifth rotary element that is connected to the third rotary element, and a sixth rotary element, and
the engagement device includes
a first engagement device that selectively connects the first rotary element to the sixth rotary element, and
a second engagement device that selectively connects any two of the fourth rotary element, the fifth rotary element, and the sixth rotary element.

* * * * *